March 7, 1933.  H. T. MATTERN  1,900,188
CHUCK
Filed Feb. 13, 1930

INVENTOR
Herman T. Mattern

BY Thos. E. Scofield
ATTORNEY

Patented Mar. 7, 1933

1,900,188

UNITED STATES PATENT OFFICE

HERMAN T. MATTERN, OF KANSAS CITY, MISSOURI, ASSIGNOR TO HEMPY-COOPER MANUFACTURING COMPANY, OF KANSAS CITY, MISSOURI, A CORPORATION OF MISSOURI

CHUCK

Application filed February 13, 1930. Serial No. 428,043.

This invention relates to improvements in chucks, and refers more particularly to a chuck adapted to hold the crank shaft end of a connecting rod bearing by means of two compensating stops which contact the lower bolt heads of the connecting rod, thereby holding the connecting rod in alignment and rigidly in position while the bearing portion thereof is being machined.

Figure 1:
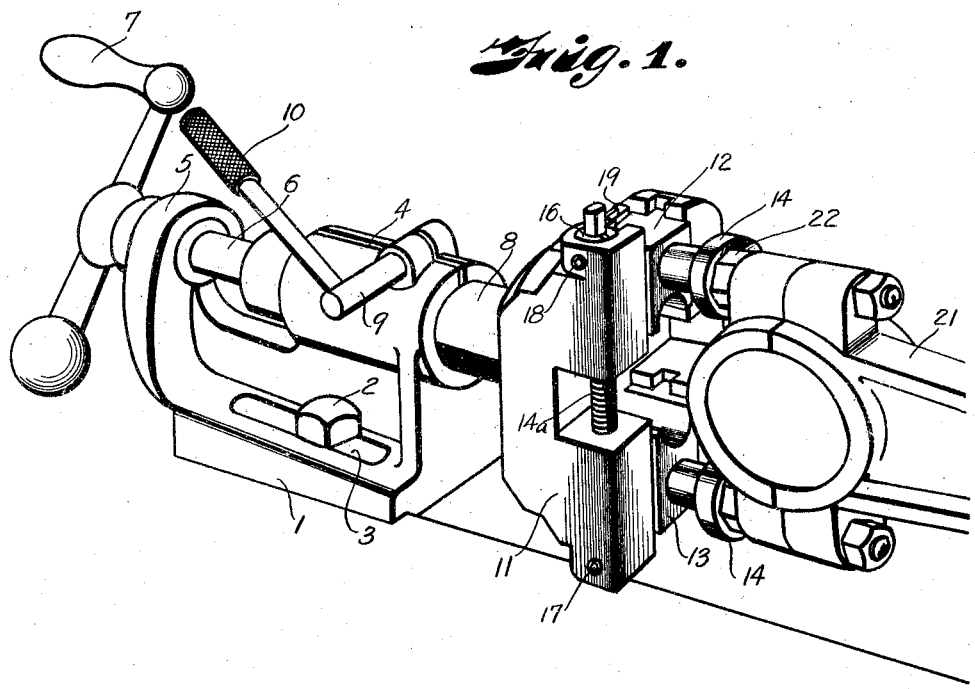
Fig. 1 is a perspective view of the chuck and support showing the connecting rod in position.

Referring to the drawing, the assembly consists of a support member 1 which may be adjustably bolted to the bed portion of a lathe by means of bolts 2, one being on each side of the support and extending through slots 3 in the member 1, and through similar slots in the bed of the lathe, not shown.

Figure 2:
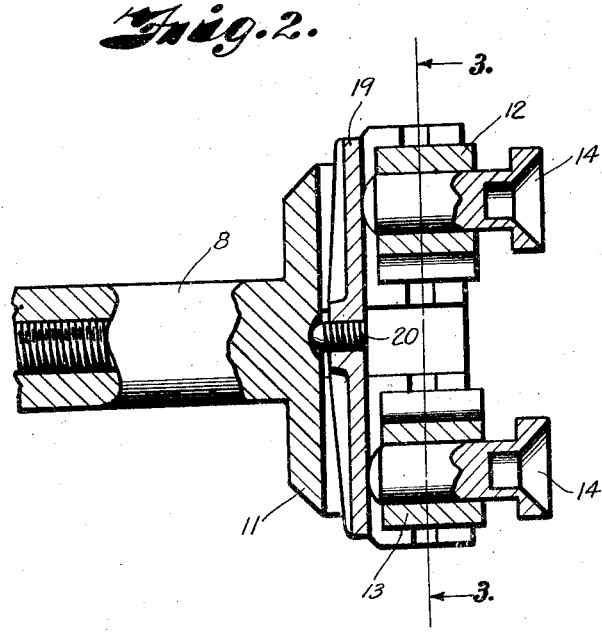
Fig. 2 is a vertical section with parts broken away.

Integral with the member 1 is a split bearing 4 and a smaller supporting bearing 5 for the feed screw 6. The feed screw 6 has at its outer extremity a handle 7 for advancing or retarding the chuck. The feed screw on the opposite extremity from the handle is threaded and engages the threads which are cut inside of the chuck stock 8 supported within the split bearing 4. The internal threaded portion of the stock 8 is shown in Fig. 2. A stock clamp for rigidly holding the stock when the connecting rod is adjusted in place for machining is furnished, consisting of a transverse screw 9 and clamp handle 10 which serves to diminish the size of the split bearing portion 4 of the member 1.

Figure 3:
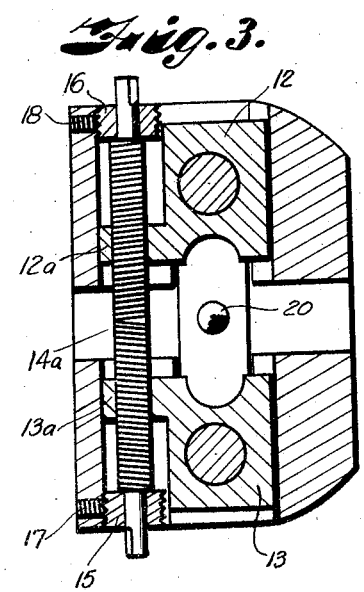
Fig. 3 is a view taken along the line 3—3 in Fig. 2.

In the drawing the head of the chuck is designated as 11 and is an integral part of the stock 8. The chuck head is so formed that there is a rectangular portion on the four corners of the head, the central vertical cut-away portion forming a track or slide for two adjustable carriers 12 and 13. Slidably positioned in these carriers are upper and lower compensating stops 14. The carriers 12 and 13 have portions thereof designated in the drawing as 12a and 13a, extending longitudinally into the screw well formed in two of the solid portions of the chuck head. The members 12a and 13a are oppositely threaded by right and left handed screws to accommodate the adjustment screw 14ª which is likewise threaded oppositely on its upper half as on its lower half in order to adjust the carriers in opposite directions when rotated by means of a key which may be fitted upon either the upper or lower end as shown in Figs. 1 and 3 of the drawing. In order to hold the adjustment screw 14ª in position, plug screws 15 and 16 are threaded into the upper and lower solid members of the chuck head by means of a spanner wrench or key; these plugs are rigidly held in position by means of set screws 17 and 18 respectively.

Behind the stops 14 and fitting into the back of the vertical channel in the chuck head is a narrow plate 19 which is movably mounted on the chuck by a central pivot 20. This plate contacting the back of the compensating stops 14 assures an accurate alignment of the connecting rod due to the fact that, as one stop is retarded or advanced the opposite stop is moved likewise in an opposite direction by the pivoted plate 19.

As shown in the drawing, the connecting rod 21, when fixed in place to be machined, has its two lower bolt heads 22 fitted into the conical recesses of the compensating stops. The opposite, or wrist pin end of the connecting rod has been previously mounted upon a mandrel. To set up the connecting rod in this rigid position, the chuck 11 which holds the crank shaft end is advanced and the bolt heads of the rod contacted by the compensating stops of the chuck at which time the connecting rod is automatically brought in alignment due to the slidable mounting of the stops in the carrier and their contact with the plate 19. The adjustment of the stops to get the stops to properly align with the bolt heads is effected by means of the adjustment screw 14ª and, once set, can be used without change for the same size connecting rods. Adjustment of the distance between the stops is only necessary when different sizes of connecting rods are to be machined and where the distance between the bolt heads on the crank shaft end of the connecting rods vary.

As suggested, the standard or support member 1 carrying the chuck stock is mounted on a transverse lathe bed slide in order to position the connecting rod bearing properly so that the bearing portion may be machined by the use of a mandrel carrying a cutting tool which operates through the bearing.

As suggested, the invention lies primarily in the use of compensating stops automatically adjustable to the bolt heads of the connecting rod when the connecting rod is put in position to have its crank shaft bearing machined together with the manual adjustment feature for varying the distance between the stops to accommodate rods of different sizes.

It will be noted that the chuck is rotatable on its stock in the supporting bearing 4, thus permitting the chuck head to be moved to any desired angle in order to accurately contact the bolt heads of the connecting rod. This feature is especially important as it has been found that almost invariably after use a connecting rod is warped or distorted due to heat or torsional strain. Such slight warping is usually not corrected when the bearing is re-babbitted and machined due to the fact that it usually re-occurs when the connecting rod is installed again in the motor. It is obvious then that the head having a free rotative movement when being set against the rod, the chuck head will accommodate itself to any slight distortion which the rod may have from a vertical plane.

Furthermore, the fact that the chuck is free to rotate also permits its use with four bolt connecting rods. In setting up a rod of this type, the cupped stops or pins are set against the heads of the bolts on a diagonal and the bearing machined while the connecting rod is being held in this manner.

I claim as my invention:

1. In a chuck for holding the crank shaft end of a connecting rod during machining of the bearing, the combination including a support, a head rotatably mounted in said support, means for advancing and retracting said head along the axis of rotation, a plurality of carriers slidably mounted in said head, stops positioned in said carriers, and means to vary the distance between said stops.

2. In a chuck for holding the crank shaft end of a connecting rod during machining of the bearing, the combination comprising a support, a head rotatably mounted in said support, means for advancing and retracting said head along the axis of rotation, carriers slidably mounted in said head, stops slidably positioned in said carriers, means for equalizing the pressure between said stops and means to move said carriers along a line perpendicular to said axis of rotation whereby to vary the distance between said stops.

In testimony whereof I affix my signature.

HERMAN T. MATTERN.